United States Patent
Howe et al.

(10) Patent No.: US 12,451,672 B2
(45) Date of Patent: Oct. 21, 2025

(54) THREE-DIMENSIONAL GRAPHENE NETWORK ELECTRODE FOR A HIGH-POWER SWITCH CIRCUIT

(71) Applicant: The Boeing Company, Arlington, VA (US)

(72) Inventors: Wayne R. Howe, Irvine, CA (US); Jeffrey H. Hunt, Thousand Oaks, CA (US)

(73) Assignee: The Boeing Company, Arlington, VA (US)

( * ) Notice: Subject to any disclaimer, the term of this patent is extended or adjusted under 35 U.S.C. 154(b) by 163 days.

(21) Appl. No.: 18/179,129

(22) Filed: Mar. 6, 2023

(65) Prior Publication Data

US 2024/0305068 A1 Sep. 12, 2024

(51) Int. Cl.
H01T 2/02 (2006.01)

(52) U.S. Cl.
CPC ..................................... *H01T 2/02* (2013.01)

(58) Field of Classification Search
CPC .................. H01T 1/15–24; H01T 2/00–02
See application file for complete search history.

(56) References Cited

U.S. PATENT DOCUMENTS

| | | | |
|---|---|---|---|
| 4,407,849 A | 10/1983 | Haas et al. | |
| 4,771,168 A * | 9/1988 | Gundersen | H01T 2/00 313/538 |
| 5,038,082 A | 8/1991 | Arita et al. | |
| 5,510,668 A | 4/1996 | Rohwein et al. | |
| 6,049,174 A | 4/2000 | Pirrie et al. | |
| 7,053,536 B1 | 5/2006 | Boman et al. | |
| 8,031,514 B2 | 10/2011 | Somu et al. | |
| 8,350,472 B2 * | 1/2013 | Chen | H01T 2/00 313/542 |
| 9,368,581 B2 | 6/2016 | Sandhu | |
| 2007/0165351 A1 | 7/2007 | Menke | |
| 2011/0215717 A1 | 9/2011 | Chen et al. | |
| 2015/0295270 A1 * | 10/2015 | Chun | H01M 50/534 429/211 |

FOREIGN PATENT DOCUMENTS

| | | |
|---|---|---|
| CN | 101777730 A | 7/2010 |
| CN | 102664106 A | 9/2012 |
| CN | 106058644 A | 10/2016 |
| CN | 108539581 A | 9/2018 |

(Continued)

OTHER PUBLICATIONS

European Patent Office, Extended European Search Report Issued in Application No. 24153647.3, Jul. 1, 2024, Germany, 7 pages.

(Continued)

*Primary Examiner* — Bryan R Perez
(74) *Attorney, Agent, or Firm* — Alleman Hall & Tuttle LLP

(57) ABSTRACT

One disclosed example provides a high-power switch circuit, comprising a cathode and an anode. One or more of the cathode and the anode comprises a three-dimensional graphene network. The high-power switch circuit further comprising a gap separating the cathode and the anode, a high-power voltage source electrically connected to the cathode and the anode, and a trigger device configured to selectively control triggering of an electrical current between the cathode and the anode.

20 Claims, 6 Drawing Sheets

(56) References Cited

FOREIGN PATENT DOCUMENTS

| | | | |
|---|---|---|---|
| CN | 108598868 A | 9/2018 |
| CN | 108767660 A | 11/2018 |
| CN | 109052317 A | 12/2018 |
| CN | 112582884 A | 3/2021 |
| DE | 102019109542 A1 | 10/2020 |
| DE | 102020204248 A1 | 10/2020 |
| FR | 2984027 A1 | 6/2013 |
| JP | S58220373 A | 12/1983 |
| JP | H07161270 A | 6/1995 |
| JP | H0836952 A | 2/1996 |
| JP | H08167360 A | 6/1996 |
| KR | 20200036511 A | 4/2020 |
| WO | 9967865 A | 12/1999 |
| WO | 2011130929 A1 | 10/2011 |
| WO | 2021026538 A1 | 2/2021 |

OTHER PUBLICATIONS

Bhasavanich, D. et al., "Development of a Compact, High-Energy Spark Gap Switch and Trigger Generator System," Eighth IEEE International Conference on Pulsed Power, Jun. 16, 1991, San Diego, California, USA, 3 pages.

Dai, H. et al., "Experimental study of graphite electrode erosion under premixed atmosphere in spark gap switch," 2019 IEEE Pulsed Power and Plasma Science Conference, Oral Presentation Jun. 23, 2019, Orlando, Florida, USA, 1 page (Abstract Only, as no materials included with oral presentation).

Deng, W. et al., "Electronic transport in carbon nanotube-graphene contact," Micro & Nano Letters, vol. 9, Issue 10, Oct. 2014, 4 pages.

Dai, H. et al., "Research on plasma arc oxidation efficiency of spark gap switch with graphite electrodes" High Power Laser and Particle Beams, vol. 33, Issue 6, Jun. 2021, 9 pages (Submitted with English Abstract as Explanation of Relevance).

Li, L. et al., "Analysis of Electrical Contact Temperature Rise in Spark Gap Switches with Graphite Electrodes," IEEE Transactions on Dielectrics and Electrical Insulation, vol. 18, No. 4; Aug. 2011, 7 pages.

Li, L. et al., "Analysis on Electrode Replacement of Spark-Gap Switches With Graphite Electrodes," IEEE Transactions on Plasma Science, vol. 39, Issue 9, Aug. 4, 2011, 7 pages.

Li, L. et al., "Study on Pre-fire Phenomenon for Multiplex High-energy Spark Gap Switches with Graphite Electrodes," IEEE Transactions on Dielectrics and Electrical Insulation, vol. 19, Issue 3, Jun. 15, 2012, 7 pages.

Zeng, H. et al., "Study on erosion mechanism of graphite electrode in two-electrode spark gap switch," Review of Scientific Instruments, vol. 83, Issue 1, Jan. 13, 2012, 6 pages.

\* cited by examiner

THREE-DIMENSIONAL GRAPHENE NETWORK ELECTRODE FOR A HIGH-POWER SWITCH CIRCUIT

FIELD

The disclosed examples relate to high-power switch circuits and machines utilizing high-power switch circuits. The disclosed examples can be used for high-power, electromagnetic applications in land environments, aerial environments, space environments, near-space environments, and/or submarine environments. Example high-power, electromagnetic applications include communication, power, and sensing with minimal degradation to the switch elements.

BACKGROUND

Electrical systems for electromagnetic applications can employ high-power switches to periodically or aperiodically switch high voltages. For example, high-power microwave and radiofrequency antennas can use high-power switches to generate signals for long-range transmission. For such applications, high-power switches having fast rise and fall times are desired, as a slow rise and/or fall time can reduce a usable switching frequency. Further, a slow rise and/or fall time can also reduce a usable bandwidth of electromagnetic waves generated by the high-power switch.

SUMMARY

One disclosed example provides a high-power switch circuit, comprising a cathode and an anode. One or more of the cathode and the anode comprises a three-dimensional graphene network. The high-power switch circuit further comprising a gap separating the cathode and the anode, a high-power voltage source electrically connected to the cathode and the anode, and a trigger device configured to selectively control triggering of an electrical current between the cathode and the anode.

Another disclosed example provides a machine, comprising a high-power switch circuit. The high-power switch circuit comprises a cathode and an anode. One or more of the cathode and the anode comprise a three-dimensional graphene network. The high-power switch circuit further comprises a gap separating the cathode and the anode, a high-power voltage source electrically connected to the cathode and the anode, and a trigger device configured to selectively control triggering of an electrical current between the cathode and the anode.

Another disclosed example provides a method for operating a high-power switch circuit. The method comprises applying a high-voltage power source across a cathode and an anode of the high-power switch circuit. One or more of the cathode and the anode comprises a three-dimensional graphene network. The method further comprises triggering an electrical current between the cathode and the anode using a signal from a trigger device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
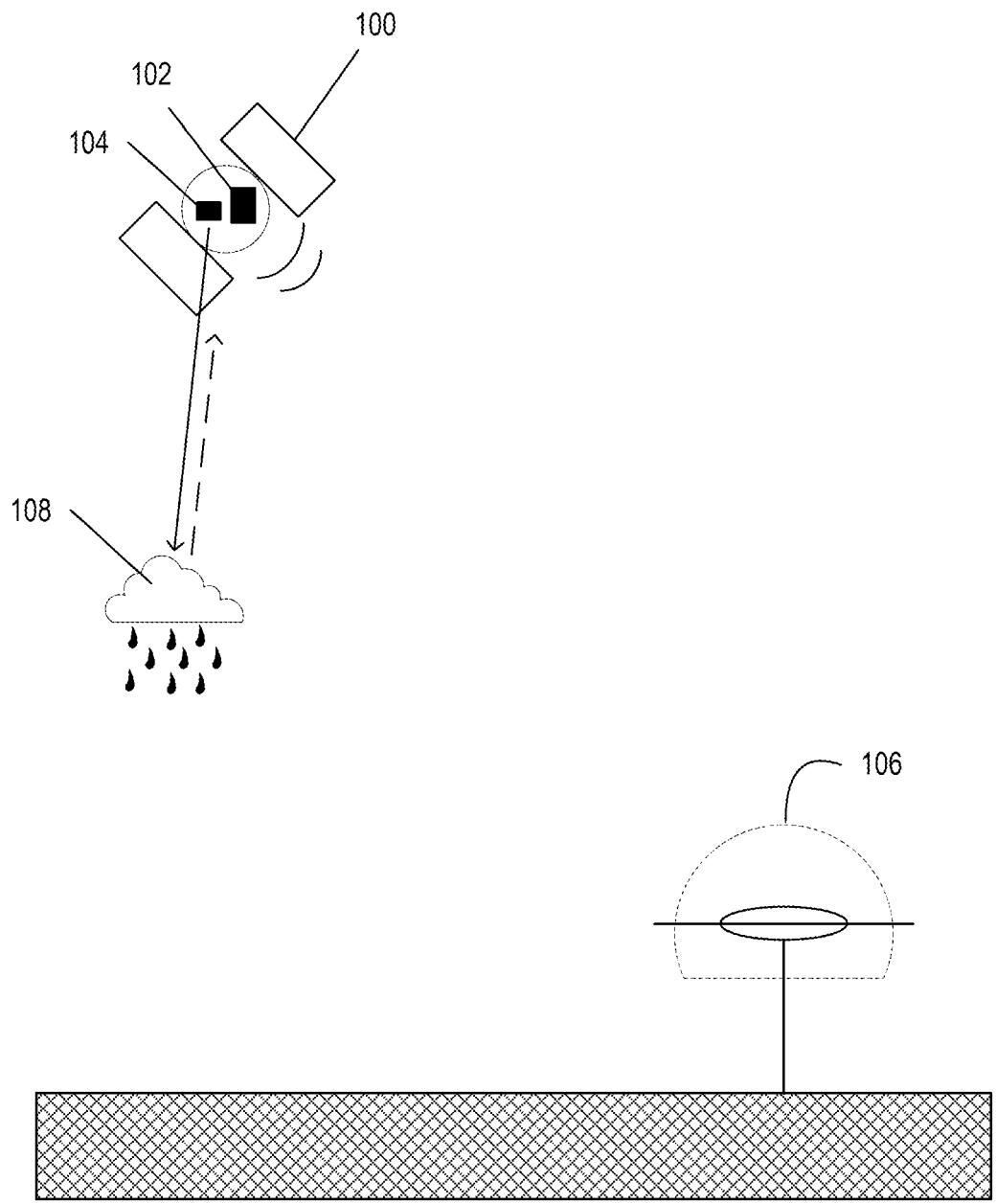
FIG. 1 depicts an example machine operating in a space environment.

As previously mentioned, a high-power switch having fast rise and fall times can be desired for electromagnetic applications switching a high voltage at frequency. Faster rise and fall times can help to increase an operating frequency and/or a bandwidth of a switching device comprising the high-power switch as compared to slower rise and fall times. As used herein, the term "rise time" generally represent a time for a voltage to rise from a lower specified value to a higher specified value. A shorter rise time is considered faster, and thus desirable for higher frequencies.

However, currently available high-voltage switches can be cumbersome and unreliable. One currently available high-power switch is a Krytron switch. A Krytron switch comprises two electrodes separated by a gap. The Krytron switch further comprises an alpha particle-emitting radioactive material configured to maintain a small pool of plasma between the electrodes to enable a fast rise time of a voltage to kilovolt levels. While no radiation leaves a gas tube of the Krytron switch, the radioactive material requires special handling. Further, the gas tube of the Krytron switch has internal complexity. The internal complexity can cause the Krytron switch to be expensive to manufacture, and/or difficult to produce at a large scale.

Another currently available high-power switch is a spark gap switch. A spark gap switch comprises two conducting electrodes separated by a gap. When a dielectric breakdown condition of the gap is met, a spark forms in the gap, triggering electrical current to flow between the electrodes. The distance across a gap in a spark gap switch is selected to prevent spontaneous dielectric breakdown occurring before reaching a desired switching time. However, charge accumulation in the gap between spark cycles can result in unwanted capacitance and/or inductance. The capacitance and/or inductance can limit switching times of the spark gap switch. Such switching times can comprise rise times in the microsecond or millisecond range, which is too slow for certain electromagnetic applications. Further, spark gap switches can be large and have substantial jitter associated with electrical switching characteristics. Jitter generally represents a deviation from true periodicity of a presumably periodic signal, typically in the time domain. Large jitter on a high-power switch can reduce a switching frequency and/or impact a bandwidth.

The previously mentioned arcing between the two conducting electrodes of the spark gap switch can further result in metal deposition from one electrode to the other due to electrode sputtering. Such metal deposition can shorten a usable lifespan of the conducting electrodes and thus the spark gap switch. However, replacing a spark gap switch in certain remote environments can be difficult and expensive.

Examples of the remote environments include space environments, near-space environments, and submarine environments. Delivering components and/or performing maintenance can be difficult or impossible in such locations.

One possible solution for extending a usable lifespan of a spark gap switch is to coat the conducting electrodes in graphene. However, the coated graphene can delaminate and break-off from the electrodes. Further, higher switching frequencies may heat up the electrodes and increase a rate of delamination of the coated graphene.

Accordingly, examples are disclosed that relate to using a three-dimensional graphene network as a material for electrodes of a high-power switch circuit. Briefly, a high-power switch circuit comprises a cathode, an anode, and a gap separating the cathode and the anode. One or both of the cathode and the anode comprise a three-dimensional graphene network. The three-dimensional graphene network is different in structure than the layer structure of graphite. For example, graphite is formed from a plurality of graphene sheets each bonded to adjacent graphene sheets through weak Van der Waals forces. The individual graphene sheets, each comprising a network of carbon rings characterized by long-range delocalized $sp^2$ pi orbital bonding, have high mechanical strength. However, graphite is weakly-bound in the direction normal to the plane of each graphene sheet due to the Van der Waals bonding. Thus, the sheets can easily be separated from one another. This can allow the graphite to be damaged by the periodic switching of a high-power switch.

In contrast, a three-dimensional graphene network comprises delocalized pi bonding of carbon rings in directions other than along planar sheets. Three-dimensional graphene networks can be formed, for example, by performing chemical vapor deposition of graphene layers onto porous three-dimensional templates, followed by the removal of the template material. The resulting three-dimensional graphene network does not display the weakly-bound layered structure of graphite. As such, electrodes comprising a three-dimensional graphene network can be more resistant to failure due to delamination compared to layered graphite. Similarly an electrode formed from a three-dimensional graphene network also can be stronger than a layer of graphene coating a metal substrate, as such a graphene layer can delaminate from the metal substrate due, for example, to thermal stresses caused by the cycling of the high-power switch.

An electrode formed from a three-dimensional graphene network can have a higher mechanical strength than metal electrodes due to the three-dimensional network of carbon rings with delocalized $sp^2$ pi orbital bonding. Further, graphene is also highly electrically conductive, and thus can support arcing and electrical current flow between electrodes of a switch. Further, graphene comprises fewer free electrons than metals. This may help to reduce a distance of the gap between a cathode and an anode formed from the three-dimensional graphene network while helping to hold-off a spontaneous dielectric breakdown that is outside of ordinary switch breakdown conditions. A smaller distance of the gap can help to reduce a rise time and jitter over a spark gap switch having metal electrodes. Thus, the use of electrodes comprising three-dimensional graphene networks can enable a longer usable lifespan of the cathode and/or anode, and thus the high-power switch circuit, than a metal electrode coated in a layer of graphene, while helping to reduce rise times and jitter.

The disclosed example high-power switch circuits further comprise a high-power voltage source electrically connected to the cathode and the anode. A trigger device is configured to selectively control triggering of an electrical current between the cathode and the anode. As discussed in more detail below, the trigger device is used to meet a dielectric breakdown condition of the gap between the cathode and the anode to trigger the electrical current. Generally, fall times of the electrical current tend to be fast as removing the dielectric breakdown condition can quickly stop the electrical current between the cathode and the anode.

Before discussing the disclosed example high-power switch circuits in detail, FIG. 1 depicts an example machine 100 that uses a high-power switch circuit. Machine 100 is depicted in the form of a satellite configured to perform various electromagnetic applications in a space environment. Machine 100 comprises a communication transmitter 102. Here, communication transmitter 102 uses a high-power switch circuit to generate communication with a ground station 106. Generating high-power electromagnetic waves helps communication transmitter 102 to transmit the generated electromagnetic waves over a longer distance than a lower power transmitter system. The communication can include a carrier signal and/or a message signal. Examples of high-power switch circuits are discussed below with reference to FIGS. 3 and 4. Communication transmitter 102 can be configured as a radio frequency transmitter and/or a microwave transmitter. In other examples, communication transmitter 102 can transmit in another suitable frequency.

Machine 100 further comprises a sensing device 104 configured as an active sensing device. In the depicted example, sensing device 104 transmits electromagnetic waves and receives reflected electromagnetic waves from cloud 108. Such a configuration helps sensing device 104 to determine data related to cloud 108 based on the reflected electromagnetic waves. In other examples, sensing device 104 can be configured in another suitable manner to determine data related to other suitable entities. Similar to communication transmitter 102, sensing device 104 comprises a high-power switch circuit to generate the electromagnetic waves. In other examples, machine 100 can use a high-power switch circuit for another suitable high-power switching application, such as high-power long-range radar.

As machine 100 is configured to operate in the space environment, maintenance of machine 100 can be challenging and costly. As such, a longer usable lifespan of the high-power switch circuit is desirable. As mentioned above, using a three-dimensional graphene network for electrodes of the high-power switch circuit can help to extend a usable lifespan of the high-power switch circuit over metal electrodes coated in graphene. FIG. 1 is illustrative. In other examples, machine 100 can take other suitable forms for use in a space environment, a near-space environment, an aerial environment, a land-based environment, or another suitable environment having significant altitude and/or elevation. Examples of other suitable forms include dirigibles, drones, other suitable unmanned airborne craft, and mountain-top devices. In further examples, machine 100 can omit communication transmitter 102 or sensing device 104. In yet other examples, machine 100 can be in communication with a second machine located on or near the ground. The second machine can comprise one or more of a communication transmitter, a radar transmitter, and a sensing device. In such examples, the second machine can communicate or perform remote sensing in a direction from the second machine to machine 100 and/or with other ground stations.

Figure 2:
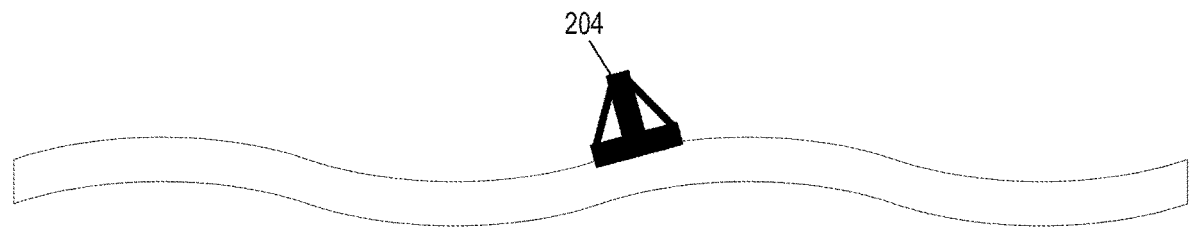
FIG. 2 depicts an example machine operating in a submarine environment.
Figure 2:
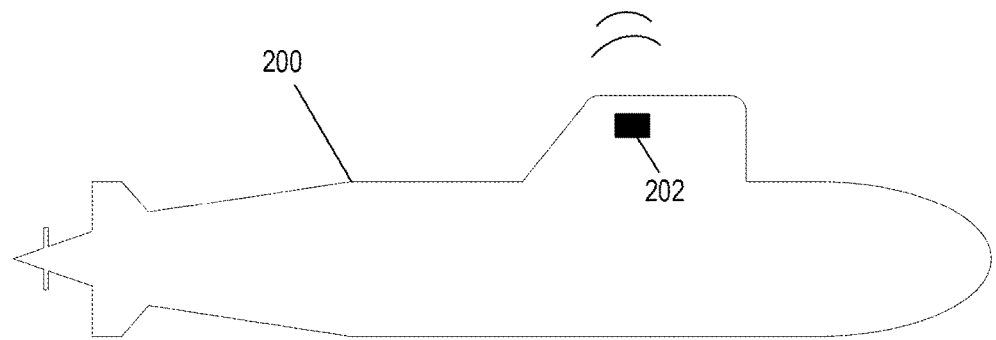

Machines operating in surface or submarine environments can also benefit from an increased usable lifespan of a high-power switch circuit. FIG. 2 depicts an example machine 200 in the form of a submarine vessel. As shown, machine 200 operates in a submarine environment where equipment repairs can be challenging and/or costly. Machine 200 comprises a communication transmitter 202. Here, communication transmitter 202 is in communication with a communication buoy 204. Similar to communication transmitter 102, communication transmitter 202 uses a high-power switch circuit to generate the communication. The communication can comprise radio frequency, microwave frequency, radar frequency, and/or another suitable frequency. While machine 200 is depicted in the form of a submarine vessel, in other examples, machine 200 can be in other suitable forms of submarine or submersible vessels configured as manned or unmanned vehicles in remote or autonomous operation. In further examples, machine 200 can communicate with a second machine on the surface. The second machine can comprise one or more of a communication transmitter, a radar transmitter, and a sensing device. In some such examples, the second machine can further be configured to communication with a third machine located at a higher altitude than second machine.

Although FIG. 1 and FIG. 2 use high-power switch circuits to generate high-frequency electromagnetic waves, it is also clear to those in the art that the high-power switch circuits as disclosed herein may also be used to control standard high-power low-frequency (for example 60 Hertz) or direct current (DC) high-power circuits for power-control non-radio-frequency circuits that are not used for communications or sensing, such as high-power transmission lines, for example.

Figure 3:
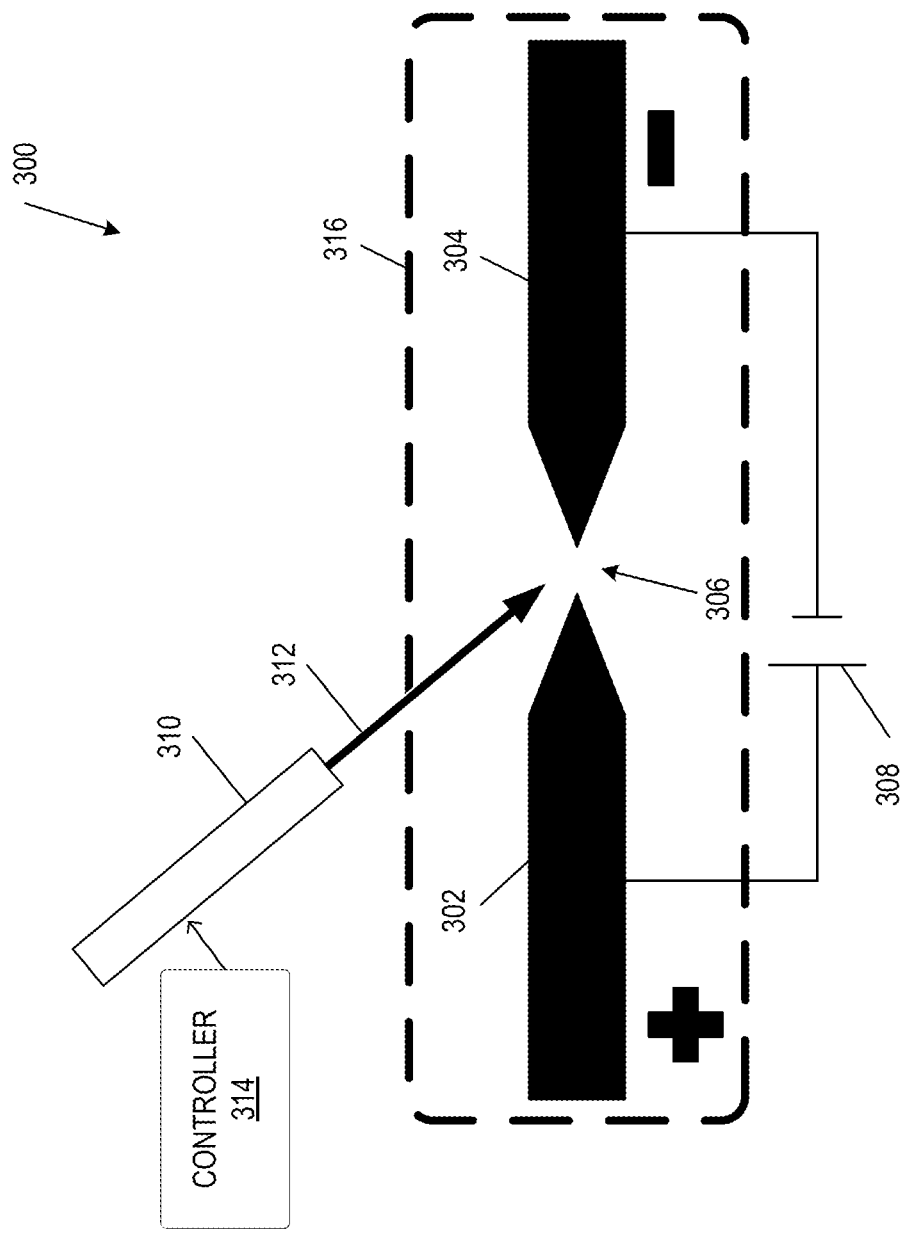
FIG. 3 schematically shows an example high-power switch circuit for use in the machines of FIG. 1 and FIG. 2.

The examples of FIG. 1 and FIG. 2 use high-power switch circuits to generate electromagnetic waves. FIG. 3 schematically depicts an example high-power switch circuit 300. High-power switch circuit 300 can be used in communication transmitter 102, sensing device 104, and communication transmitter 202, for example. High-power switch circuit 300 comprises a cathode 302, an anode 304, and a gap 306 separating cathode 302 and anode 304. Here, both cathode 302 and anode 304 comprise a three-dimensional graphene network. As discussed above, the three-dimensional graphene network can help to increase a lifespan and reduce degradation of cathode 302 and anode 304 over graphene-coated metal electrodes. Further, the three-dimensional graphene network can help to reduce a distance between cathode 302 and anode 304. Such a configuration can help to reduce a rise time and jitter magnitude over a spark gap switch having graphene-coated metal electrodes. In other examples, either cathode 302 or anode 304 can comprise the three-dimensional graphene network.

High-power switch circuit 300 further comprises a high-power voltage source 308 electrically connected to cathode 302 and anode 304. High-power voltage source 308 is configured to be on the order of 5 to 20 volts under a dielectric breakdown voltage of gap 306. In some examples, high-power voltage source 308 can comprise a voltage in a range from hundreds of volts to thousands of volts. High-power switch circuit 300 further comprises a pulsed laser 310 as a trigger device. The trigger device is configured to selectively control triggering of an electrical current between cathode 302 and anode 304. More specifically, laser light 312 from pulsed laser 310 excites electrons in cathode 302 and/or anode 304 to the conduction band. When a sufficient number of electrons are excited to the conduction band to generate a local pool of electrons in the presence of high-power voltage source 308, the local pool of electrons can drive the electrical current through gap 306. In such a manner, pulsed laser 310 can optically induce a dielectric breakdown between cathode 302 and anode 304. In some examples, pulsed laser 310 can comprise a high peak intensity on the order of a kilowatt per square centimeter. The optical breakdown can have a shorter rise time than ramping a voltage to reach a dielectric breakdown voltage of gap 306. Thus, pulsed laser 310 can help to decrease a time for triggering the electrical current. Further, when laser light 312 is turned off, no electrons get excited to trigger the electrical current. In such a manner, a fall time of the electrical current is sufficient.

A controller 314 is configured to operate pulsed laser 310 to selectively control triggering the electrical current. Controller 314 and pulsed laser 310 can be configured to trigger periodically or aperiodically the electrical current at a microwave frequency, a radio frequency, or another suitable frequency. Such a configuration can help a transmitter using high-power switch circuit 300 to generate electromagnetic waves in microwave and/or radio frequencies. In other examples, controller 314 can be omitted. In such examples, high-power switch circuit 300 is configured to receive an input indicating the selective control of pulsed laser 310.

High-power switch circuit 300 further comprises an optional tube 316 holding a hold-off gas. The hold-off gas in gap 306 helps to reduce spontaneous dielectric breakdown in gap 306 before a desired engineered time. Further, the hold-off gas also can help to further reduce a distance of gap 306. In some examples, gap 306 can comprise a distance within a range of 5 microns to 5 mm, inclusive of the endpoints. In other examples, gap 306 can have a distance outside of this range. In some examples, the hold-off gas can comprise xenon fluoride. In other examples, another suitable gas can be used. In other examples, gap 306 can comprise a reduced pressure environment.

Selecting the distance of gap 306 can involve balancing various factors. For example, a relatively wider gap can be used for a relatively higher voltage of high-power voltage source 308. Other factors include a selected hold-off gas in tube 316, and shapes selected for cathode 302 and anode 304. For example, a sharper point of cathode 302 and/or anode 304 will have a higher local electrical field. As such, a wider gap 306 can be used for a relatively sharper electrode than for a relatively less sharp electrode.

In such a manner, high-power switch circuit 300 can have fast rise times and low jitter while helping to extend a usable lifespan of high-power switch circuit 300. In some examples, the fast rise times can be on the order of sub-nanoseconds. FIG. 3 is illustrative. In other examples, one or both of cathode 302 and anode 304 can take a different shape. Examples include electrodes with rounded ends, with planar ends, and/or other suitable geometries.

Figure 4:
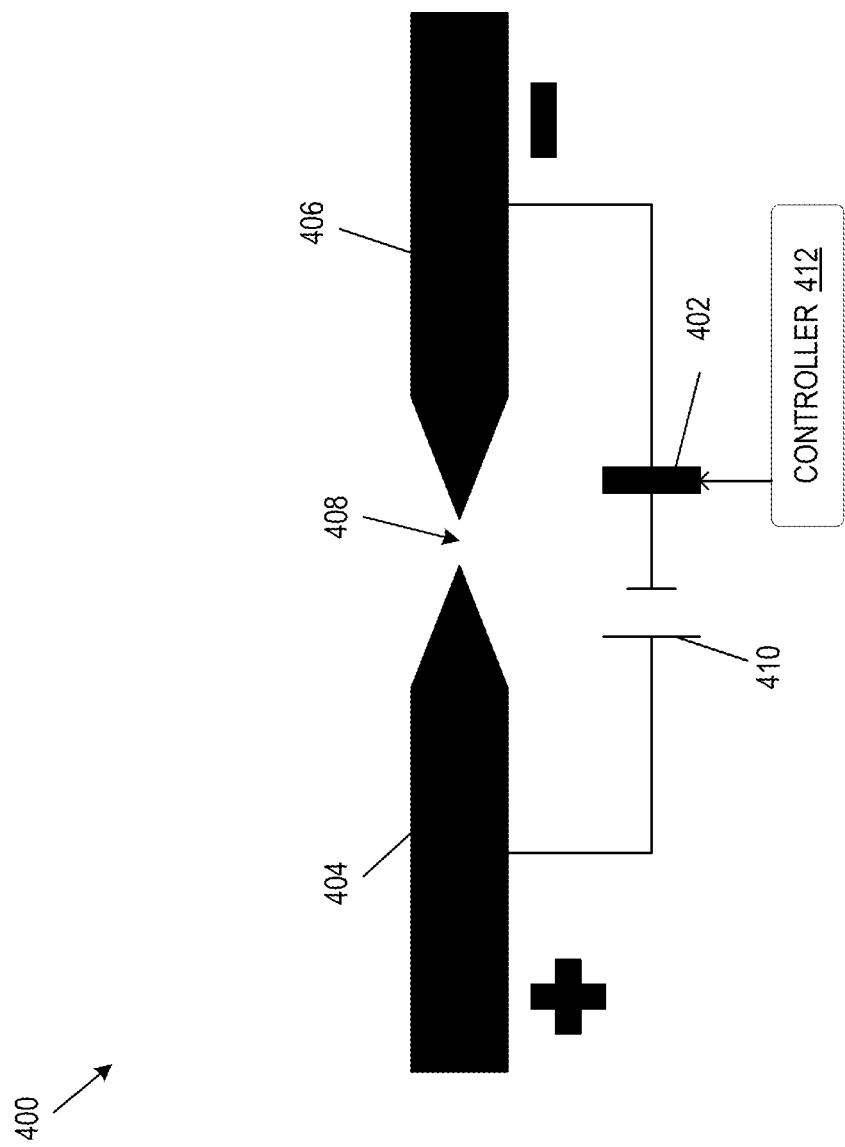
FIG. 4 schematically shows another example high-power switch circuit for use in the machines of FIG. 1 and FIG. 2.

The example of FIG. 3 utilizes a pulsed laser as a trigger device. In other examples, the trigger device can comprise a trigger voltage source. FIG. 4 schematically depicts an example high-power switch circuit 400 having a trigger voltage source 402. Similar to high-power switch circuit 300, high-power switch circuit 400 comprises a cathode 404, an anode 406, a gap 408, and a high-power voltage source 410. In contrast, high-power switch circuit 400 uses trigger voltage source 402 as the trigger device. The trigger voltage source 402 is configured to selectively add a sufficient voltage to the voltage of the high-power voltage source 410 to controllably trigger a dielectric breakdown between the cathode 404 and the anode 406. More particularly, controller 412 selectively controls switching of trigger voltage source 402. The switching of trigger voltage source 402 to an on-state applies a voltage of trigger voltage source 402 in series with a voltage of high-power voltage source 410. The combined voltages from trigger voltage source 402 and high-power voltage source 410 increase a voltage across gap 408 such that the dielectric breakdown condition of gap 408 is met. When the dielectric breakdown condition is met, a flow of electrical current is triggered by generating an electrical arc between cathode 404 and anode 406. The voltage of trigger voltage source 402 is considerably less than the voltage of high-power voltage source 410. In some examples, trigger voltage source 402 comprises a voltage of 5 volts, 10 volts, or 20 volts, while high-power voltage source 410 comprises a voltage on the order of hundreds to thousands of volts. As smaller voltages have faster rise times than larger voltages, a rise time of trigger voltage source 402 can be faster than a rise time of high-power voltage source 410 from similar starting voltage levels. Thus, the use of trigger voltage source 402 helps to enable a faster a rise time of the electrical current. FIG. 4 is illustrative. In other examples, one or both of cathode 404 and anode 406 can take a different shape, as described above for high-power switch circuit 300. In further examples, controller 412 can be omitted. In such examples, high-power switch circuit 400 can be configured to receive an input indicating the selective control of trigger voltage source 402.

Figure 5:
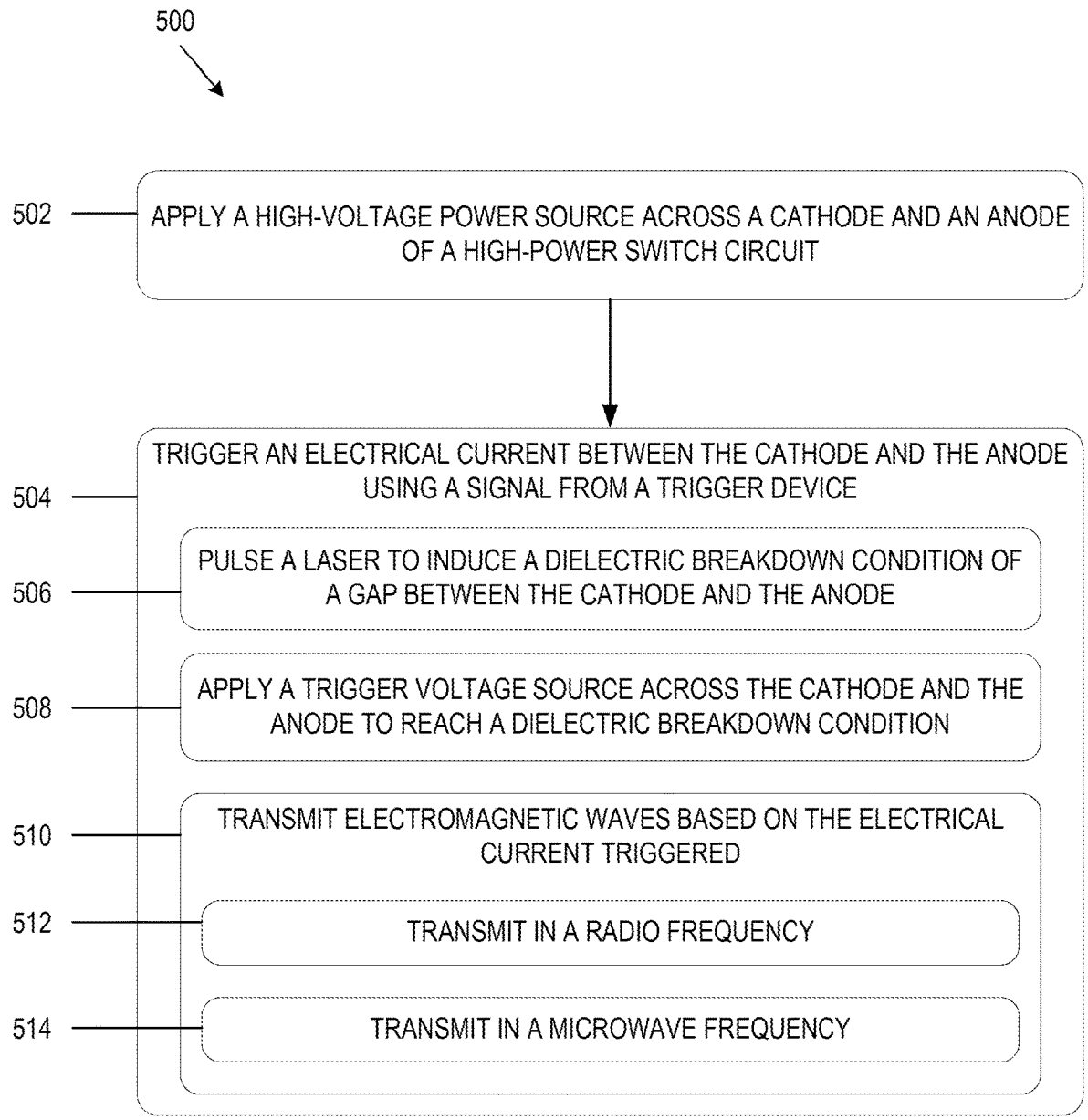
FIG. 5 illustrates a flow diagram of an example method for operating a high-power switch circuit.

FIG. 5 depicts a flow diagram of example method 500 for operating a high-power switch circuit. Method 500 can be used to operate high-power switch circuit 300 or high-power switch circuit 400, for example. Portions of method 500 can be performed by controller 314, controller 412, or another suitable computing system. Method 500 comprises, at 502, applying a high-power voltage source across a cathode and an anode of the high-power switch circuit. In various examples, one or both of the cathode and the anode comprises a three-dimensional graphene network. As previously mentioned, the three-dimensional graphene network can help to reduce rise times and jitter of the high-power switch circuit while increasing a useable lifespan of the high-power switch circuit over a spark gap switch with coated electrodes.

Method 500 further comprises triggering an electrical current between the cathode and the anode using a signal from a trigger device, at 504. The electrical current can be triggered across the gap by forming an electrical arc across a gap between the cathode and the anode. In various examples, the trigger device comprises a trigger voltage source, a pulsed laser, or another suitable trigger device.

In examples where the trigger device comprises a pulsed laser, triggering the electrical current comprises pulsing a laser to induce a dielectric breakdown condition of the gap between the cathode and the anode, as indicated at 506. As previously mentioned, when a sufficient number of electrons are excited by the laser to the conduction band for an electrical current to flow, the dielectric breakdown condition is met. In some examples, a pulsed laser with a high-peak intensity can be used to trigger the electrical current between the cathode and the anode. The high-peak intensity can be on the order of a kilowatt per square centimeter.

In the examples where the trigger device comprises the trigger voltage source, triggering the electrical current comprises applying a trigger voltage source across the cathode and the anode to reach a dielectric breakdown condition of a gap between the cathode and the anode, as indicated at 508. The dielectric breakdown condition can include reaching or exceeding a dielectric breakdown voltage of the gap between the cathode and the anode. More specifically, applying, in series, a smaller voltage of the trigger voltage source and a higher voltage of the high-power voltage source across the cathode and the anode increases a voltage across the gap to form the electrical arc. In some examples, the trigger voltage source can provide a voltage within a range of 5 volts to 20 volts, inclusive of the endpoints. In other examples, the trigger voltage source can provide a voltage outside of this range.

Continuing, in some examples, method 500 further comprises, at 510, transmitting electromagnetic waves based on the electrical current triggered. In some examples, the electromagnetic waves can be used for communication. In other examples, the electromagnetic waves can be used for sensing or other suitable high-power switching applications. The electromagnetic waves can comprise a radio frequency, as indicated at 512, a microwave frequency, as indicated at 514, or another suitable frequency.

A high-power switch circuit comprising electrodes comprising a three-dimensional graphene network as described herein, can help to increase a usable lifespan of the high-power switch circuit over a spark gap switch having coated metal electrodes. Such a usable lifespan can help to deploy a high-power switch circuit in an operating environment that is challenging and/or expensive to perform maintenance. Further, the high-power switch can comprise faster rise times and lower jitter than the spark gap switch.

In some embodiments, the methods and processes described herein may be tied to a computing system of one or more computing devices. In particular, such methods and processes may be implemented in hardware as described above, as a computer-application program or service, an application-programming interface (API), a library, and/or other computer-program product.

Figure 6:
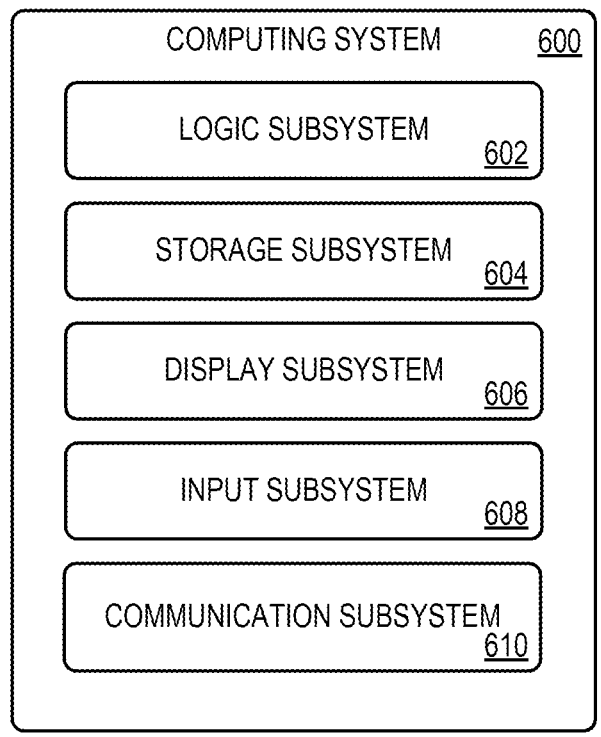
FIG. 6 depicts a block diagram of an example computing system.

FIG. 6 schematically shows a simplified representation of an example computing system 600 configured to provide any to all of the compute functionality described herein. Computing system 600 may take the form of one or more personal computers, server computers, and computers integrated with aircraft or other suitable machines, as examples. Sensing device 104, controller 314, and controller 412 are examples of computing system 600. Further, communication transmitter 102 and communication transmitter 202 can be operatively coupled with computing system 600. Method 500 may be performed by computing system 600.

Computing system 600 includes a logic subsystem 602 and a storage subsystem 604. Computing system 600 may optionally include a display subsystem 606, input subsystem 608, communication subsystem 610, and/or other subsystems not shown in FIG. 6.

Logic subsystem 602 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 602 can include one or more hardware processors configured to execute software instructions. Additionally, or alternatively, logic subsystem 602 can include one or more hardware or firmware devices configured to execute hardware or firmware instructions. Processors of logic subsystem 602 can be single-core or multi-core, and the instructions executed thereon may be configured for sequential, parallel, and/or distributed processing. Individual components of logic subsystem 602 optionally can be distributed among two or more separate devices, which may be remotely located and/or configured for coordinated processing. Aspects of logic subsystem 602 can be virtualized and executed by remotely accessible, networked computing devices configured in a cloud-computing configuration.

Storage subsystem 604 includes one or more physical devices configured to temporarily and/or permanently hold computer information such as data and instructions executable by logic subsystem 602. When storage subsystem 604 includes two or more devices, the devices may be collocated and/or remotely located. Storage subsystem 604 can include volatile, nonvolatile, dynamic, static, read/write, read-only, random-access, sequential-access, location-addressable, file-addressable, and/or content-addressable devices. Storage subsystem 604 can include removable and/or built-in devices. When logic subsystem 602 executes instructions, the state of storage subsystem 604 can be transformed—e.g., to hold different data.

Storage subsystem 604 can include removable and/or built-in devices. Storage subsystem 604 can include optical memory (e.g., CD, DVD, HD-DVD, Blu-Ray Disc, etc.), semiconductor memory (e.g., RAM, EPROM, EEPROM, etc.), and/or magnetic memory, among others. Storage subsystem 604 can include volatile, nonvolatile, dynamic, static, read/write, read-only, random-access, sequential-access, location-addressable, file-addressable, and/or content-addressable devices.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

Logic subsystem 602 and storage subsystem 604 can cooperate to instantiate one or more logic machines. As used herein, the term "logic machine" is used to collectively refer to the combination of hardware, firmware, software, instructions, and/or any other components cooperating to provide computer functionality. In other words, "logic machines" are never abstract ideas and always have a tangible form. A logic machine can be instantiated by a single computing device, or a logic machine can include two or more sub-components instantiated by two or more different computing devices. In some implementations a logic machine includes a local component (e.g., software application executed by a computer processor) cooperating with a remote component (e.g., cloud computing service provided by a network of server computers). The software and/or other instructions that give a particular logic machine its functionality can optionally be saved as one or more unexecuted modules on one or more suitable storage devices.

When included, display subsystem 606 can be used to present a visual representation of data held by storage subsystem 604. This visual representation may take the form of a graphical user interface (GUI). As the herein described methods and processes change the data held by the storage subsystem, and thus transform the state of storage subsystem 604, the state of display subsystem 606 may likewise be transformed to visually represent changes in the underlying data. Display subsystem 606 can include one or more display devices utilizing virtually any type of technology. Such display devices can be combined with logic subsystem 602 and storage subsystem 604 in a shared enclosure, or such display devices may be peripheral display devices.

When included, input subsystem 608 may comprise or interface with one or more input devices such as a keyboard and touch screen. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for collected audio data; and an infrared, color, stereoscopic, and/or depth camera for machine vision.

When included, communication subsystem 610 can be configured to communicatively couple computing system 600 with one or more other computing devices. Communication subsystem 610 can include wired and/or wireless communication devices compatible with one or more different communication protocols. As non-limiting examples, the communication subsystem may be configured for communication via a wireless telephone network, electromagnetic waves, or a wired or wireless local- or wide-area network. In some embodiments, the communication subsystem can allow computing system 600 to send and/or receive messages to and/or from other devices via a network such as the Internet.

Further, the disclosure comprises configurations according to the following clauses.

Clause 1. A high-power switch circuit, comprising: a cathode and an anode, wherein one or more of the cathode and the anode comprises a three-dimensional graphene network; a gap separating the cathode and the anode; a high-power voltage source electrically connected to the cathode and the anode; and a trigger device configured to selectively control triggering of an electrical current between the cathode and the anode.

Clause 2. The high-power switch circuit of clause 1, wherein the trigger device comprises a pulsed laser.

Clause 3. The high-power switch circuit of clause 1, wherein the trigger device comprises a trigger voltage source.

Clause 4. The high-power switch circuit in any one of clauses 1, 2, or 3, wherein the trigger device is configured to trigger at a microwave frequency.

Clause 5. The high-power switch circuit in any one of clauses 1, 2, or 3, wherein the trigger device is configured to trigger at a radio frequency.

Clause 6. The high-power switch circuit in any of clauses 1-5, wherein both the cathode and the anode comprise the three-dimensional graphene network.

Clause 7. The high-power switch circuit in any of clauses 1-6, wherein the gap comprises a hold-off gas.

Clause 8. The high-power switch circuit of in any one of clauses 1-7, wherein the trigger device is configured to trigger at a radar frequency.

Clause 9. A machine comprising: a high-power switch circuit, the high-power switch circuit comprising a cathode and an anode, wherein one or more of the cathode and the anode comprises a three-dimensional graphene network; a gap separating the cathode and the anode; a high-power voltage source electrically connected to the cathode and the anode; and a trigger device configured to selectively control triggering of an electrical current between the cathode and the anode.

Clause 10. The machine of clause 9, wherein the machine comprises a communications transmitter.

Clause 11. The machine of clause 10, wherein the communications transmitter is configured as a radio frequency transmitter.

Clause 12. The machine of clause 10, wherein the communications transmitter is configured as a microwave transmitter.

Clause 13. The machine of any of clauses 9-12, wherein the machine comprises a sensing device.

Clause 14. The machine in any one of clauses 9-13, wherein the machine is configured for use in one or more of a space environment, a near-space environment, an aerial environment, a land-based environment, or a submarine environment.

Clause 15. A method for operating a high-power switch circuit, the method comprising: applying a high-power voltage source across a cathode and an anode of the high-power switch circuit, wherein one or more of the cathode and the anode comprises a three-dimensional graphene network; and triggering an electrical current between the cathode and the anode using a signal from a trigger device.

Clause 16. The method of clause 15, wherein said triggering the electrical current comprises pulsing a laser to induce a dielectric breakdown condition of a gap between the cathode and the anode.

Clause 17. The method of clause 15, wherein said triggering the electrical current comprises applying a trigger voltage source across the cathode and the anode to reach a dielectric breakdown condition of a gap between the cathode and the anode.

Clause 18. The method in any one of clauses 15-17, further comprising transmitting electromagnetic waves based on the electrical current triggered.

Clause 19. The method of clause 18, wherein said transmitting the electromagnetic waves comprises transmitting in a radio frequency.

Clause 20. The method of clause 18, wherein said transmitting the electromagnetic waves comprises transmitting in a microwave frequency.

The invention claimed is:

1. A high-power switch circuit, comprising:
a cathode and an anode, wherein one or more of the cathode and the anode comprises a three-dimensional graphene network, wherein the three-dimensional graphene network comprises a three-dimensional network of carbon rings with delocalized pi bonding in directions other than along planar sheets;
a gap separating the cathode and the anode;
a high-power voltage source electrically connected to the cathode and the anode; and
a trigger device configured to selectively control triggering of an electrical current between the cathode and the anode.

2. The high-power switch circuit of claim 1, wherein the trigger device comprises a pulsed laser.

3. The high-power switch circuit of claim 1, wherein the trigger device comprises a trigger voltage source.

4. The high-power switch circuit of claim 1, wherein the trigger device is configured to trigger at a microwave frequency.

5. The high-power switch circuit of claim 1, wherein the trigger device is configured to trigger at a radio frequency.

6. The high-power switch circuit of claim 1, wherein both the cathode and the anode comprise the three-dimensional graphene network.

7. The high-power switch circuit of claim 6, wherein the gap comprises a hold-off gas.

8. The high-power switch circuit of claim 1, wherein the trigger device is configured to trigger at a radar frequency.

9. A machine, comprising:
a high-power switch circuit, comprising:
a cathode and an anode, wherein one or more of the cathode and the anode comprises a three-dimensional graphene network, wherein the three-dimensional graphene network comprises a three-dimensional network of carbon rings with delocalized pi bonding in directions other than along planar sheets;
a gap separating the cathode and the anode;
a high-power voltage source electrically connected to the cathode and the anode; and
a trigger device configured to selectively control triggering of an electrical current between the cathode and the anode.

10. The machine of claim 9, wherein the machine comprises a communications transmitter.

11. The machine of claim 10, wherein the communications transmitter is configured as a radio frequency transmitter.

12. The machine of claim 10, wherein the communications transmitter is configured as a microwave transmitter.

13. The machine of claim 9, wherein the machine comprises a sensing device.

14. The machine of claim 9, wherein the machine is configured for use in one or more of a space environment, a near-space environment, an aerial environment, a land-based environment, or a submarine environment.

15. A method for operating a high-power switch circuit, the method comprising:
applying a high-power voltage source across a cathode and an anode of the high-power switch circuit, wherein one or more of the cathode and the anode comprises a three-dimensional graphene network, wherein the three-dimensional graphene network comprises a three-dimensional network of carbon rings with delocalized pi bonding in directions other than along planar sheets; and
triggering an electrical current between the cathode and the anode using a signal from a trigger device.

16. The method of claim 15, wherein said triggering the electrical current comprises pulsing a laser to induce a dielectric breakdown condition of a gap between the cathode and the anode.

17. The method of claim 15, wherein said triggering the electrical current comprises applying a trigger voltage source across the cathode and the anode to reach a dielectric breakdown condition of a gap between the cathode and the anode.

18. The method of claim 15, further comprising transmitting electromagnetic waves based on the electrical current triggered.

19. The method of claim 18, wherein said transmitting the electromagnetic waves comprises transmitting in a radio frequency.

20. The method of claim 18, wherein said transmitting the electromagnetic waves comprises transmitting in a microwave frequency.

* * * * *